Dec. 5, 1967  L. S. YAGGY ETAL  3,356,878
SIGNAL CONVERTING CATHODE RAY TUBE WITH CONTROLLABLE ERASURE
Filed Aug. 2, 1965
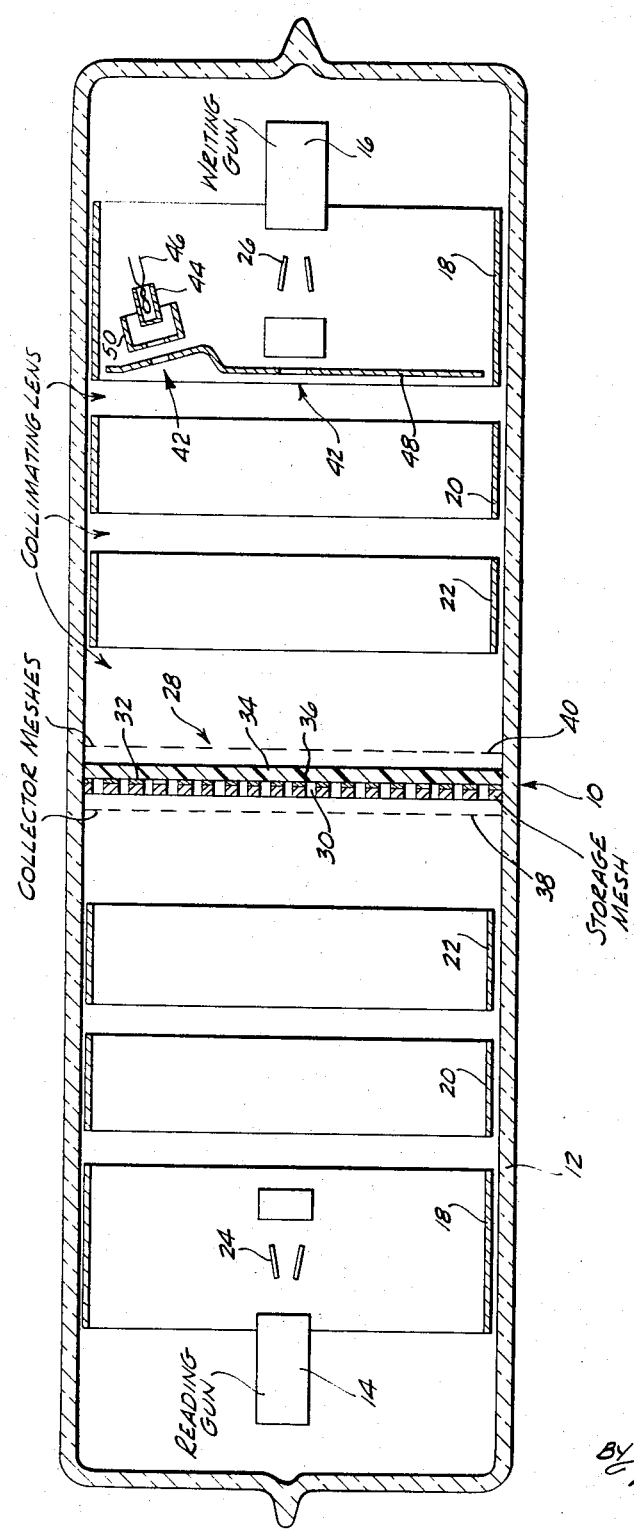
INVENTORS.
LEON S. YAGGY,
NOBUO J. KODA,
BY
ATTORNEY.

United States Patent Office 3,356,878
Patented Dec. 5, 1967

3,356,878
SIGNAL CONVERTING CATHODE RAY TUBE WITH CONTROLLABLE ERASURE
Leon S. Yaggy, North Carlsbad, and Nobuo J. Koda, Vista, Calif., assignors to Hughes Aircraft Company, Culver City, Calif., a corporation of Delaware
Filed Aug. 2, 1965, Ser. No. 476,237
3 Claims. (Cl. 313—68)

ABSTRACT OF THE DISCLOSURE

A scan conversion electron tube is disclosed to provide a mode of converting electrical signals of one frequency to another. The tube is an elongated enevelope having a writing gun one one side thereof and a reading gun at the other side thereof. A storage target is disposed intermediate the guns. A flood gun to accomplish controllable decay erasure time is located in the envelope adjacent the writing gun. The storage target comprises a metallic mesh facing the reading gun and an insulator positioned thereon and facing the writing gun. The insulator is provided with diffused metallic segments within its body and throughout its width in those areas immediately overlying the metallic mesh which are thereby rendered electrically conductive. Thus, a mesh pattern of approximately identical potential is provided in the target facing the respective writing and reading guns.

---

This invention relates to cathode ray tubes known commercially as scan conversion tubes whereby electrical signals having a scanning pattern of one frequency are impinged on a storage target and converted into electrical signals via a target scanning pattern of a different frequency.

In certain applications it is desired to transmit radar-type displays at television scan frequencies. Radar signals are derived by relatively slow scanning frequency in comparison with television scanning frequencies. For example, a typical radar scan frequently used has a cycle time of about 10 seconds in comparison with a television-type scan which may have a cycle time of $\frac{1}{30}$ of a second. Electronic scan conversion systems must therefore employ some means for storing the slower scan signals while subsequently deriving faster scan signals corresponding thereto. In general, scan-conversion tubes of the prior art have utilized a storage target comprising a perforated conducting screen having on one side, a coating of secondary emissive dielectric material. The target is disposed between a pair of opposed electronic guns respectively referred to as the writing and reading guns. The writing gun scans the coated side of the target at a first frequency and establishes thereon a charge pattern of stored electrical potential as a result of secondary emission of the dielectric material. The potential of the stored charge pattern is variable depending upon the intensity of the writing beam and represents the input signals. The reading gun is disposed on the opposed side of the target and scans the uncoated side thereof at a different scan frequency. The reading beam penetrates the storage target and is modulated in specific relation to the charge pattern stored thereon. Thus, a varying electronic current of the reading beam is obtained and is utilized to provide an output signal at reading beam frequency and corresponding to the charge pattern created by the writing beam and therefore related to the input signals.

One type of storage target which has been used to advantage comprises a metallic mesh which is manufactured by a suitable electroforming process and has placed thereon, by evaporation or other suitable means, a continuous layer of a highly conductive material such as gold. A continuous coating of dielectric material overlies the mesh and gold combination, the gold being diffused through the coating of dielectric material in areas congruent with the metallic mesh. As a result the dielectric layer in the gold-diffused regions may be said to be electrically shorted to the mesh electrode and will operate at the same potential as the mesh. The writing beam, therefore, only writes and stores charges on the portions of dielectric material in the mesh area intermediate the mesh wires. Thus, the areas of dielectric material on which the charges are stored is clearly visible to the reading beam on the opposed side of the storage target.

As is well understood in certain scan conversion tubes the energy level of the reading beam is such that it is non-destructive relative to the charge pattern created by the writing beam. The action of the reading beam does not "erase" the charge pattern. It is desirable that some mode of erasing the charge pattern be provided to facilitate sequential informational displays. Preferably, the rate of erasure should be controllable so that the length of the time display may be varied to suit the specific application.

It is, therefore, a primary object of the invention to provide a scan conversion type cathode ray tube for translating signals of one frequency to signals at another frequency and incorporating means of erasure of the primary signal pattern.

It is yet a further object of the invention to provide a cathode ray tube of the type described incorporating structure which will accommodate the controllable erasure of the primary storage pattern and thus control the length of display time.

These and other objects of the invention will become apparent in the course of the following description and from an examination of the related drawing, wherein:

The single figure is a longitudinal sectional view, partly in elevation, of a cathode ray tube incorporating the invention.

Describing the invention in detail and directing attention to the drawing, an evacuated cathode ray tube is indicated generally at 10 and comprises a tubular envelope 12 of suitable insulating material such as glass. A reading gun 14 is located at one end of the envelope 12 and a writing gun 16 is positioned at the other end of the envelope 12. Appropriate collimating lens systems 18, 20 and 22 are positioned in operative association with the reading and writing guns, respectively. Deflection means 24 and 26 are in operative association with the reading and writing guns, respectively. The guns, deflection means and lens systems are conventional structures, the function of which is well understood in the electronic tube art. A more detailed description of same therefore is thought unecessary. The deflection means 24 and 26 may be either electromagnetic or electrostatic, both of which provide satisfactory operation.

Centrally of the envelope 12 a storage target is indicated generally at 28. The target 28, in its preferred form, comprises a metallic mesh electrode 30 which may be electroformed nickel or copper and may have, for example, approximately 750 holes per inch. On the side of the electrode 30 facing the writing gun, a continuous layer of gold 32 is positioned and may be placed thereon using conventional evaporation techniques. A thin plastic film is then stretched over the mesh surface adjacent the gold. A plastic known in the field of "Collodian" has been found satisfactory, although others may be used. Thereafter, a thin layer of appropriate dielectric material 34 is evaporated over the entire surface of the mesh 30. By an appropriate baking operation, the plastic film is burned off and the gold 32 is caused to diffuse, as at 36, 36 through the adjacent discrete segments of the material 34. In a preferred embodiment of the invention the dielectric material 34 may be about 0.2 micron thick. Zinc sulfide has been found to be a desirable dielectric material. As a result of the noted gold diffusion pattern 36, the areas of dielectric material congruent to the mesh wires are electrically shorted and both sides of the target will operate at approximately the same potential. The areas of material 34 intermediate the mesh wire are visible to both electron guns.

On each side of the target 28 collector electrodes 38 and 40 are positioned and comprise conductive screens which allow high transmission of moving electrons. The collector electrodes or grids 38 and 40 operate to collect secondary electrons emitted from the target.

In that portion of the envelope 2 occupied by the writing gun 16 a flood gun, indicated generally at 42, is provided. In a preferred embodiment of the invention the flood gun may comprise a cathode 44 having a heater 46 in operative association therewith. An anode 48 is positioned forwardly to the cathode 44 for the purpose of providing appropriate electron acceleration. Intermediate the anode 48 and cathode 44 a control grid 50 is disposed.

Excitation of the cathode 44 is provided, in a conventional manner, by the heater 46. Upon excitation a flooding electronic beam is created and the anode 48 provides appropriate beam acceleration toward the target 28. Lens systems 20 and 22 may provide appropriate electrostatic fields to collimate the flood beam and cover the entire surface of the target 28. Flood beam control is provided by grid 50, that is, if the grid potential is made sufficiently negative relative to the cathode 44 the effect will be to add to the space charge created by the cathode 44 and prevent electron flow therefrom. As the grid 50 is made more positive with respect to the cathode 44 flow of electrons from the cathode is increased. Thus the intensity of the flood beam can be adjusted by means of controlling the potential on the grid 50.

Describing briefly the operation of the disclosed tube it will be understood that the cathode of the reading gun 14 will be considered zero potential reference point. Initially, the mesh electrode 30 has applied thereto a potential of about 25 volts positive. The reading gun electrode is then energized and its beam is caused to scan the dielectric material 34 that is exposed thereto through the mesh of the electrode 30. The velocity of the reading gun is below the secondary emission cross-over point for the dielectric material so that the portions of the material 34 thus scanned receive a negative charge and are brought to the approximate potential of the reading gun cathode. When this charge level is reached the reading gun electrons no longer impinge upon the dielectric material 34. Subsequently, the potential of the electrode 30 is lowered to about 5 volts and, because of the capacitance between the mesh electrode and dielectric material 34, the potential of the latter is lowered to approximately −20 volts. Under these conditions the reading beam electrons no longer land on the mesh material 18 but are collected by the collector mesh 38.

To initiate the writing phase of the tube by the disposition of positive charges on the dielectric material 36, the writing gun cathode is operated at a negative potential with respect to the dielectric potential and its beam is caused to scan the dielectric material 34 at a velocity above the secondary-emission crossover point of the dielectric material. Thus positive charges are created on the material and are related to the intensity and duration of the writing beam with reference to each discrete segment of the dielectric material 34. As is well known, the writing beam is intensity-modulated in accordance with certain input signals which represents information to be displayed. Under these circumstances the surface of the dielectric material which is visible to the reading gun 14 is charged more positive relative to the unwritten areas because of the capacitance and thinness of the material 34. Thereafter the "reading" side of the target is scanned by the reading beam and variable quantities of electrons are then able to land on the mesh electrode 30 while the balance are returned to the collector mesh 38. Output signals are generated in the collector mesh 38 which in effect are modulated in accordance with the charge pattern on the dielectric material 34. Thus the intelligence or information relating to the writing gun frequency is translated into an appropriate signal which is developed by the reading gun at a different frequency.

As is well known, the readout mode just described is non-destructive. That is, the reading beam does not erase the charge pattern placed on the dielectric material 34 by the beam of the writing gun 16. Thus it is possible to read out the stored information for many minutes. It is desirable, for efficient use of the equipment, that an appropriate mode of erasure of the charge pattern be provided. It is also desirable that the erasure be controllable from very rapid charge decay rates to very slow decay rates so that display time may be adapted to the particular information transmitted.

To effect controlled fade or erasure the flood gun 42 is controllably operated. The electron beam generated from the flood gun 42 contains low energy flood electrons which impinge upon the dielectric material 34 at a velocity below the first crossover point of the dielectric material, that is, at less than unity. The flood beam electrons, therefore, charge the surface of the dielectric material 34 in a negative direction until stabilization near the potential of the flood gun cathode is reached. The potential of the flood gun cathode may be controllably set at any desired level that is advantageous to achieve the particular erasure. In the example above, if the flood gun cathode is at a −20 volts, the flood beam will erase the surface of the target to that potential before writing occurs. The rate at which the surface of the dielectric material 34 is negatively charged by the flood beam can be adjusted by controlling the potential on the control grid 50 which controls the flood beam current or by pulsing the flood beam on and off at a predetermined duty cycle. Thus, the storage time, or decay rate of the charge on the dielectric material 34 may be incrementally varied from very rapid decay for a high flood beam current to extremely slow decay for a low flood beam current and thus display time is controlled.

While the flood gun is here illustrated as being located on the writing side of the target 28 it will be understood that it may be located on either side of the target since the potentials on opposed sides thereof do not differ significantly by virtue of the target structure earlier described.

The invention as described is by way of illustration and not limitation and may be modified in various particulars within the scope of the appnded claims.

What is claimed is:

1. In an electronic storage tube for converting input electrical signals at one frequency into output electrical signals at another frequency, the combination of an evacuated envelope, a storage target within the envelope, a pair of electron guns positioned in the envelope for forming electron beams to respectively scan opposed sides of the target at different frequencies, the gun on one side of the target comprising a writing gun operative to scan the target at a first frequency and the gun on the opposed side of the target comprising a reading gun operative to scan the target at a different frequency, said target comprising a metallic mesh electrode having a layer of dielectric material on one side thereof, said material including electrically conductive regions of diffused electrically conductive metal in those areas of the dielectric material in substantially congruent overlying relationship and in direct contact with the metallic mesh segments whereby a mesh pattern is provided on opposed sides of the target facing the respective guns existent at substantially similar potential levels, whereby the dielectric material on said one side of the target defines island areas of nonconductive dielectric material capable of acquiring charge patterns in response to the impingement of the electron beam created by the writing gun, one of said beams being operative to charge aspects of said material in a positive direction, collecting means to capture secondary electrons emitted from said material in response to impingement thereon of one of said beams and thereby provide an output signal responsive to the charge existent on said islands of dielectric material, and another electron gun to form a flood electron beam for impingement on the target and to charge said material in a negative direction.

2. In an electronic storage tube for converting input electronic signals at one frequency into output electronic signals at another frequency, the combination of an evacuated envelope, a storage target positioned within the envelope centrally thereof, a first writing electron gun positioned within the envelope on one side of said target operative to form an electron beam modulated in response to said input signal, a reading electron gun positioned in the envelope on the other side of said target and operative to form an electronic beam to scan the other side of said target, said target comprising a metallic mesh electrode member, a layer of dielectric material disposed on the side of said electrode member facing the electron gun and extending over the metallic portions thereof as well as over the openings therein, said layer of dielectric material having electrically conductive regions of diffused electrically conductive metal in substantially congruent overlying relationship with and in electrical contact with and approximately coextensive with said metallic portions of the mesh electrode member thus presenting a mesh pattern on opposed sides of the target facing the respective writing and reading guns existing at substantially similar potential level, said layer of dielectric material defining islands of electrically resistive material capable of holding a charge in response to the action of the writing gun, means disposed in said envelope adjacent said target for collecting secondary electrons emitted from said dielectric material in response to the impingement thereon of the beam from said writing gun, other means disposed in said envelope for collecting secondary electrons emitted from said dielectric material in response to the impingement thereon of the beam formed by said reading gun and deriving from said collected secondary electrons output signals directly related to the charge pattern formed on said islands of resistive material, said writing gun electron beam being operative to charge said material in a positive direction, and other flood electron gun means sequentially operable in relation to said writing gun to form another electron beam for impingement on said material and to charge the islands of resistive material in a negative direction, said islands of resistive material being exposed to the guns on both sides of the target.

3. An electronic storage tube according to claim 2, wherein said last-mentioned electron gun is a flood gun operative to create a flood beam of low energy electrons to continuously impinge on the entire surface of said target, said flood gun being located within the envelope adjacent said writing gun.

References Cited

UNITED STATES PATENTS

| 2,500,633 | 3/1950 | Edwards | 315—12 X |
| 2,926,419 | 3/1960 | Harris | 313—68 X |
| 3,243,644 | 3/1966 | Roe | 313—68 X |

FOREIGN PATENTS

| 727,739 | 4/1955 | Britain. |

ROBERT SEGAL, *Primary Examiner.*

JAMES W. LAWRENCE, *Examiner.*